(12) United States Patent
Qin et al.

(10) Patent No.: US 9,376,508 B2
(45) Date of Patent: Jun. 28, 2016

(54) POLYMERS AND USE THEREOF IN PREPARATION OF HIGH IMPACT POLYMERIC COMPOSITIONS

(75) Inventors: Zengquan Qin, Copley, OH (US); Jason T. Poulton, Stow, OH (US); Mark N. DeDecker, North Canton, OH (US); James E. Hall, Mogadore, OH (US)

(73) Assignee: Bridgestone Corporation, Tokyo (JP)

( * ) Notice: Subject to any disclaimer, the term of this patent is extended or adjusted under 35 U.S.C. 154(b) by 1344 days.

(21) Appl. No.: 13/124,230

(22) PCT Filed: Oct. 13, 2009

(86) PCT No.: PCT/US2009/060500
§ 371 (c)(1),
(2), (4) Date: Jul. 13, 2011

(87) PCT Pub. No.: WO2010/045230
PCT Pub. Date: Apr. 22, 2010

(65) Prior Publication Data
US 2011/0263794 A1 Oct. 27, 2011

Related U.S. Application Data

(60) Provisional application No. 61/105,198, filed on Oct. 14, 2008.

(51) Int. Cl.
*C08F 279/02* (2006.01)
*C08F 287/00* (2006.01)
*C08L 25/12* (2006.01)
*C08C 19/44* (2006.01)
*C08F 297/04* (2006.01)
*C08F 236/06* (2006.01)

(52) U.S. Cl.
CPC ............ *C08C 19/44* (2013.01); *C08F 297/04* (2013.01); *C08F 236/06* (2013.01); *C08F 2438/00* (2013.01)

(58) Field of Classification Search
CPC ............ C08F 8/00; C08F 8/08; C08F 8/18; C08C 19/00; C08C 19/30; C08C 19/44; C08C 19/42
USPC .............. 525/242, 274, 286, 288, 298, 312
See application file for complete search history.

(56) References Cited

U.S. PATENT DOCUMENTS

| | | | |
|---|---|---|---|
| 3,235,626 A | 2/1966 | Waack | |
| 3,786,116 A | 1/1974 | Milkovich et al. | |
| 3,842,059 A | 10/1974 | Milkovich et al. | |
| 3,862,098 A | 1/1975 | Milkovich et al. | |
| 4,104,330 A | 8/1978 | Danzig | |
| 5,104,952 A | 4/1992 | Babu | |
| 5,115,035 A * | 5/1992 | Shiraki et al. | 525/314 |
| 5,192,616 A | 3/1993 | Babu | |
| 5,266,644 A * | 11/1993 | Riffle et al. | 525/286 |
| 5,278,244 A | 1/1994 | Babu | |
| 5,959,033 A | 9/1999 | Demirors et al. | |
| 6,025,447 A | 2/2000 | Wunsch et al. | |
| 6,489,425 B1 | 12/2002 | Yoon et al. | |
| 6,756,448 B2 | 6/2004 | Lee et al. | |
| 7,235,615 B2 | 6/2007 | Quirk et al. | |
| 2007/0066699 A1 | 3/2007 | Kohno et al. | |
| 2010/0317794 A1 | 12/2010 | Tanaka | |

FOREIGN PATENT DOCUMENTS

| | | |
|---|---|---|
| CN | 101016353 A | 8/2007 |
| EP | 0106218 A1 | 4/1984 |
| EP | 0435173 A2 | 7/1991 |
| EP | 0447239 A2 | 9/1991 |
| EP | 1118639 | 7/2001 |
| JP | 62043462 | 2/1987 |
| JP | 2004-143200 | 5/2004 |
| KR | 0156575 | 12/1998 |
| WO | 2008007814 A1 | 1/2008 |
| WO | 2008078814 | 7/2008 |

OTHER PUBLICATIONS

Pobortseva, E.A., Russian Office Action in PCT/US2009/060500) dated Jul. 23, 2013, 9 pages.
Rickle, Gregory K., Abstract of "The Anionic Polymerization of Trimethylvinylsilane", J. Macromol. SCI.-CHEM, A23 (11), 1986, p. 1287.
Synthetic Rubber, 2nd edition, И.В.Гармонов , pp. 391-396, May 31, 1988.
English Translation of Notification of First Office Action for Chinese Patent Application No. 200980150253.4, Aug. 30, 2012 (7 pp.).
Hofler, Thomas, Feb. 3, 2012 Search Report from European Patent Application No. 09821119.6 (5 pp.).
Barcia, Fabio L. et al., "Synthesis and properties of epoxy resin modified with epoxy-terminated liquid polybutadiene," Polymer, vol. 44, Issue 19, pp. 5811-5819 (Sep. 2003).
Donkers, Ellen H. et al., "Chain-End Modification of Living Anionic Polybutadiene with Diphenylethylenes and Styrenes," Journal of Polymer Science: Part A: Polymer Chemistry, vol. 43, Issue 12, pp. 2536-2545 (Jun. 15, 2005).
Shin, Gwi Im, Apr. 22, 2010 International Search Report from PCT/US2009/060500 (2 pp.).
Pobortseva, E.A., Official Action from Russian Patent Office, Russian Application No. 201111941, (Jul. 23, 2013) (3 pages).
Okazaki, T., Japan Office Action in Japanese Patent Application No. 2011-532182, dated Apr. 22, 2014, 8 pages.

* cited by examiner

*Primary Examiner* — Irina S Zemel
*Assistant Examiner* — Jeffrey Lenihan
(74) *Attorney, Agent, or Firm* — Meredith E. Hooker; Nathan T. Lewis

(57) ABSTRACT

Terminally functionalized polymers that are living or pseudo-living polymers reacted with certain allyl glycidyl ethers, or certain allylhalosilanes or combinations thereof, and a process for preparing the terminally functionalized polymers. Rubber-modified polymeric compositions comprising the terminally functionalized polymers.

11 Claims, No Drawings

POLYMERS AND USE THEREOF IN PREPARATION OF HIGH IMPACT POLYMERIC COMPOSITIONS

CROSS-REFERENCE TO RELATED APPLICATIONS

This application is a national stage application of PCT/US2009/060500, which in turn claims priority to U.S. provisional application 61/105,198.

FIELD OF THE DISCLOSURE

The present disclosure relates to new polymers and the use thereof in preparing high impact polymeric compositions.

BACKGROUND OF THE DISCLOSURE

Polybutadiene or BR rubber and butadiene-styrene block polymers are widely used in the styrene polymer industry to produce high-impact polystyrene (HIPS) and acrylonitrile-butadiene-styrene copolymer (ABS). It is known that a higher degree of grafting level of styrene onto the rubber results in better properties of the HIPS. There is, accordingly, a continuing need for preparing improved high impact polymeric compositions.

SUMMARY OF THE DISCLOSURE

The present disclosure relates to new terminally functionalized polymers comprising a living polymer obtained by anionic polymerization, or a pseudo-living polymer obtained by coordination polymerization, of a diene monomer or a mixture of a diene monomer and a vinyl aromatic hydrocarbon monomer reacted with at least one of certain allyl glycidyl ethers, or at least one of certain allylhalosilanes, or combinations of the allyl glycidyl ethers and the allylhalosilanes.

The allyl glycidyl ethers suitable for use herein have the general formula $CH_2=CHCH_2OCH_2-X$ wherein X is an epoxy group as follows:

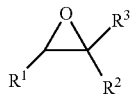

wherein $R^1$, $R^2$, and $R^3$ are the same or different, and are selected from hydrogen or a monovalent organic group. In one or more embodiments, the monovalent organic groups may include hydrocarbyl groups or substituted hydrocarbyl groups such as, but not limited to, alkyl, cycloalkyl, substituted cycloalkyl, aryl, substituted aryl, aralkyl, alkaryl, with each group having from 1 to 30 carbon atoms. The hydrocarbyl groups may contain heteroatoms such as, but not limited to, nitrogen, boron, oxygen, silicon, sulfur, and phosphorus atoms.

The allylhalosilanes suitable for use herein have the general formula $CH_2=CHCH_2Si(R^1R^2)-X$ wherein $R^1$ and $R^2$ are the same or different, and are selected from a monovalent organic group. In one or more embodiments, the monovalent organic groups may include hydrocarbyl groups or substituted hydrocarbyl groups such as, but not limited to, alkyl, cycloalkyl, substituted cycloalkyl, aryl, substituted aryl, aralkyl, alkaryl, with each group having from 1 to 30 carbon atoms. The hydrocarbyl groups may contain heteroatoms such as, but not limited to, nitrogen, boron, oxygen, silicon, sulfur, and phosphorus atoms, and X is a halide selected from a chloride, a bromide, or an iodide.

The disclosure also relates to high impact polymeric compositions such as high impact polystyrene (HIPS) and ABS, comprising the terminally functionalized polymers of the present disclosure herein.

DETAILED DESCRIPTION OF THE DISCLOSURE

The present disclosure relates to new terminally functionalized polymers comprising a living polymer obtained by anionic polymerization, or a pseudo-living polymer obtained by coordination polymerization, of a diene monomer or a mixture of a diene monomer and a vinyl aromatic hydrocarbon monomer reacted with at least one of certain allyl glycidyl ethers, or at least one of certain allylhalosilanes, or combinations of the allyl glycidyl ethers and the allylhalosilanes.

The allyl glycidyl ethers suitable for use herein have the general formula $CH_2=CHCH_2OCH_2-X$ wherein X is an epoxy group as follows:

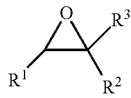

wherein $R^1$, $R^2$, and $R^3$ are the same or different, and are selected from hydrogen or a monovalent organic group. In one or more embodiments, the monovalent organic groups may include hydrocarbyl groups or substituted hydrocarbyl groups such as, but not limited to, alkyl, cycloalkyl, substituted cycloalkyl, aryl, substituted aryl, aralkyl, alkaryl, with each group having from 1 to 30 carbon atoms. The hydrocarbyl groups may contain heteroatoms such as, but not limited to, nitrogen, boron, oxygen, silicon, sulfur, and phosphorus atoms.

The allylhalosilanes suitable for use herein have the general formula $CH_2=CHCH_2Si(R^1R^2)-X$ wherein $R^1$ and $R^2$ are the same or different, and are selected from a monovalent organic group. In one or more embodiments, the monovalent organic groups may include hydrocarbyl groups or substituted hydrocarbyl groups such as, but not limited to, alkyl, cycloalkyl, substituted cycloalkyl, aryl, substituted aryl, aralkyl, alkaryl, with each group having from 1 to 30 carbon atoms. The hydrocarbyl groups may contain heteroatoms such as, but not limited to, nitrogen, boron, oxygen, silicon, sulfur, and phosphorus atoms, and X is a halide selected from a chloride, a bromide, or an iodide.

The disclosure also relates to high impact polymeric compositions such as high impact polystyrene (HIPS) and ABS, comprising the terminally functionalized polymers of the present disclosure herein.

The term "living polymer" as employed throughout the specification and claims refers to polymers which are prepared by anionic polymerization of a diene monomer or mixture of a diene monomer and a vinyl aromatic hydrocarbon monomer using an initiator such as an organolithium compound. The resultant polymer contains active terminals (e.g. lithium terminals) which can be subjected to terminating reactions.

The term "pseudo-living polymer" as employed herein refers to polymers which are prepared by coordination polymerization, wherein monomer is polymerized by using a coordination catalyst system.

In one or more embodiments, the reactive polymer is prepared by coordination polymerization, wherein monomer is polymerized by using a coordination catalyst system. The key mechanistic features of coordination polymerization have been discussed in books (e.g., Kuran, W., *Principles of Coordination Polymerization*; John Wiley & Sons: New York, 2001) and review articles (e.g., Mulhaupt, R., *Macromolecular Chemistry and Physics* 2003, volume 204, pages 289-327). Coordination catalysts are believed to initiate the polymerization of monomer by a mechanism involving the coordination or complexation of monomer to an active metal center prior to the insertion of monomer into a growing polymer chain. An advantageous feature of coordination catalysts is their ability to provide stereochemical control of polymerizations and thereby produce stereoregular polymers. As is known in the art, there are numerous methods for creating coordination catalysts, but all methods eventually generate an active intermediate that is capable of coordinating with monomer and inserting monomer into a covalent bond between an active metal center and a growing polymer chain. The coordination polymerization of conjugated dienes is believed to proceed via π-allyl complexes as intermediates. Coordination catalysts can be one-, two-, three- or multi-component systems. In one or more embodiments, a coordination catalyst may be formed by combining a heavy metal compound (e.g., a transition metal compound or a lanthanide compound), an alkylating agent (e.g., an organoaluminum compound), and optionally other co-catalyst components (e.g., a Lewis acid or a Lewis base).

Various procedures can be used to prepare coordination catalysts. In one or more embodiments, a coordination catalyst may be formed in situ by separately adding the catalyst components to the monomer to be polymerized in either a stepwise or simultaneous manner. In other embodiments, a coordination catalyst may be preformed. That is, the catalyst components are pre-mixed outside the polymerization system either in the absence of any monomer or in the presence of a small amount of monomer. The resulting preformed catalyst composition may be aged, if desired, and then added to the monomer that is to be polymerized.

Useful coordination catalyst systems include lanthanide-based catalyst systems. These catalyst systems may advantageously produce cis-1,4-polydienes that, prior to quenching, have reactive chain ends and may be referred to as pseudo-living polymers. While other coordination catalyst systems may also be employed, lanthanide-based catalysts have been found to be particularly advantageous, and therefore, without limiting the scope of the present invention, will be discussed in greater detail.

The practice of one or more embodiments of the present invention is not limited by the selection of any particular lanthanide-based catalyst. In one or more embodiments, the catalyst composition may include a lanthanide compound, an alkylating agent, and a halogen-containing compound that includes one or more labile halogen atoms. Where the lanthanide compound and/or alkylating agent include one or more labile halogen atoms, the catalyst need not include a separate halogen-containing compound; e.g., the catalyst may simply include a halogenated lanthanide compound and an alkylating agent. In certain embodiments, the alkylating agent may include both an aluminoxane and at least one other organoaluminum compound. In yet other embodiments, a compound containing a non-coordinating anion, or a non-coordinating anion precursor, i.e., a compound that can undergo a chemical reaction to form a non-coordinating anion, may be employed in lieu of a halogen-containing compound. In one embodiment, where the alkylating agent includes an organoaluminum hydride compound, the halogen-containing compound may be a tin halide as disclosed in U.S. Pat. No. 7,008,899, which is incorporated herein by reference. In these or other embodiments, other organometallic compounds, Lewis bases, and/or catalyst modifiers may be employed in addition to the ingredients or components set forth above. For example, in one embodiment, a nickel-containing compound may be employed as a molecular weight regulator as disclosed in U.S. Pat. No. 6,699,813, which is incorporated herein by reference.

Various lanthanide compounds or mixtures thereof can be employed. In one or more embodiments, these compounds may be soluble in hydrocarbon solvents such as aromatic hydrocarbons, aliphatic hydrocarbons, or cycloaliphatic hydrocarbons. In other embodiments, hydrocarbon-insoluble lanthanide compounds, which can be suspended in the polymerization medium to form the catalytically active species, are also useful.

Lanthanide compounds may include at least one atom of lanthanum, neodymium, cerium, praseodymium, promethium, samarium, europium, gadolinium, terbium, dysprosium, holmium, erbium, thulium, ytterbium, lutetium, and didymium. Didymium may include a commercial mixture of rare-earth elements obtained from monazite sand.

The lanthanide atom in the lanthanide compounds can be in various oxidation states including but not limited to the 0, +2, +3, and +4 oxidation states. Lanthanide compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds.

Without wishing to limit the practice of the present invention, further discussion will focus on neodymium compounds, although those skilled in the art will be able to select similar compounds that are based upon other lanthanide metals.

Neodymium carboxylates include neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (a.k.a. neodymium versatate), neodymium naphthenate, neodymium stearate, neodymium oleate, neodymium benzoate, and neodymium picolinate.

Neodymium organophosphates include neodymium dibutyl phosphate, neodymium dipentyl phosphate, neodymium dihexyl phosphate, neodymium diheptyl phosphate, neodymium dioctyl phosphate, neodymium bis(1-methylheptyl) phosphate, neodymium bis(2-ethylhexyl)phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl)phosphate, neodymium butyl(2-ethylhexyl) phosphate, neodymium(1-methylheptyl) (2-ethylhexyl) phosphate, and neodymium(2-ethylhexyl) (p-nonylphenyl) phosphate.

Neodymium organophosphonates include neodymium butyl phosphonate, neodymium pentyl phosphonate, neodymium hexyl phosphonate, neodymium heptyl phosphonate, neodymium octyl phosphonate, neodymium(1-methylheptyl)phosphonate, neodymium(2-ethylhexyl)phosphonate, neodymium decyl phosphonate, neodymium dodecyl phosphonate, neodymium octadecyl phosphonate, neodymium oleyl phosphonate, neodymium phenyl phosphonate, neodymium(p-nonylphenyl)phosphonate, neodymium butyl butylphosphonate, neodymium pentyl pentyiphosphonate, neodymium hexyl hexylphosphonate, neodymium heptyl heptylphosphonate, neodymium octyl octylphosphonate, neodymium(1-methylheptyl) (1-methylheptyl)phosphonate, neodymium(2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium(p-nonylphenyl) (p-nonylphenyl)phosphonate, neodymium butyl (2-ethylhexyl)phosphonate, neodymium(2-ethylhexyl)butylphosphonate, neodymium(1-methylheptyl) (2-ethylhexyl)phosphonate, neodymium(2-ethylhexyl) (1-methylheptyl) phosphonate, neodymium(2-ethylhexyl) (p-nonylphenyl) phosphonate, and neodymium(p-nonylphenyl) (2-ethylhexyl)phosphonate.

Neodymium organophosphinates include neodymium butylphosphinate, neodymium pentylphosphinate, neodymium hexylphosphinate, neodymium heptylphosphinate, neodymium octylphosphinate, neodymium(1-methylheptyl) phosphinate, neodymium(2-ethylhexyl)phosphinate, neodymium decylphosphinate, neodymium dodecylphosphinate, neodymium octadecylphosphinate, neodymium oleylphosphinate, neodymium phenylphosphinate, neodymium(p-nonylphenyl)phosphinate, neodymium dibutylphosphinate, neodymium dipentyiphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl)phosphinate, neodymium butyl(2-ethylhexyl)phosphinate, neodymium(1-methylheptyl)(2-ethylhexyl)phosphinate, and neodymium(2-ethylhexyl)(p-nonylphenyl)phosphinate.

Neodymium carbamates include neodymium dimethylcarbamate, neodymium diethylcarbamate, neodymium diisopropylcarbamate, neodymium dibutylcarbamate, and neodymium dibenzylcarbamate.

Neodymium dithiocarbamates include neodymium dimethyldithiocarbamate, neodymium diethyldithiocarbamate, neodymium diisopropyldithiocarbamate, neodymium dibutyldithiocarbamate, and neodymium dibenzyldithiocarbamate.

Neodymium xanthates include neodymium methylxanthate, neodymium ethylxanthate, neodymium isopropylxanthate, neodymium butylxanthate, and neodymium benzylxanthate.

Neodymium β-diketonates include neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Neodymium alkoxides or aryloxides include neodymium methoxide, neodymium ethoxide, neodymium isopropoxide, neodymium 2-ethylhexoxide, neodymium phenoxide, neodymium nonylphenoxide, and neodymium naphthoxide.

Neodymium halides include neodymium fluoride, neodymium chloride, neodymium bromide, and neodymium iodide. Suitable neodymium pseudo-halides include neodymium cyanide, neodymium cyanate, neodymium thiocyanate, neodymium azide, and neodymium ferrocyanide. Suitable neodymium oxyhalides include neodymium oxyfluoride, neodymium oxychloride, and neodymium oxybromide. Where neodymium halides, neodymium oxyhalides, or other neodymium compounds containing labile halogen atoms are employed, the neodymium-containing compound can also serve as the halogen-containing compound. A Lewis base such as tetrahydrofuran (THF) may be employed as an aid for solubilizing this class of neodymium compounds in inert organic solvents.

The term "organolanthanide compound" may refer to any lanthanide compound containing at least one lanthanide-carbon bond. These compounds are predominantly, though not exclusively, those containing cyclopentadienyl (Cp), substituted cyclopentadienyl, allyl, and substituted allyl ligands. Suitable organolanthanide compounds include $Cp_3Ln$, $Cp_2LnR$, $Cp_2LnCl$, $CpLnCl_2$, $CpLn(cyclooctatetraene)$, $(C_5Me_5)_2LnR$, $LnR_3$, $Ln(allyl)_3$, and $Ln(allyl)_2Cl$, where Ln represents a lanthanide atom, and R represents a hydrocarbyl group.

Various alkylating agents, or mixtures thereof, can be used. Alkylating agents, which may also be referred to as hydrocarbylating agents, include organometallic compounds that can transfer hydrocarbyl groups to another metal. Typically, these agents include organometallic compounds of electropositive metals such as Groups 1, 2, and 3 metals (Groups IA, IIA, and IIIA metals). In one or more embodiments, alkylating agents include organoaluminum and organomagnesium compounds. Where the alkylating agent includes a labile halogen atom, the alkylating agent may also serve as the halogen-containing compound.

The term "organoaluminum compound" may refer to any aluminum compound containing at least one aluminum-carbon bond. In one or more embodiments, organoaluminum compounds may be soluble in a hydrocarbon solvent.

In one or more embodiments, organoaluminum compounds include those represented by the formula $AlR_nX_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3. In one or more embodiments, mono-valent organic groups may include hydrocarbyl groups such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, sulfur, tin, and phosphorus atoms.

Organoaluminum compounds include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds.

Trihydrocarbylaluminum compounds include trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Dihydrocarbylaluminum hydride compounds include diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Hydrocarbylaluminum dihydrides include ethylaluminum dihydride, n-propylaluminum dihydride, isopropylaluminum dihydride, n-butylaluminum dihydride, isobutylaluminum dihydride, and n-octylaluminum dihydride.

Dihydrocarbylaluminum chloride compounds include diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Hydrocarbylaluminum dichloride include ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds include dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Another class of organoaluminum compounds include aluminoxanes. Aluminoxanes include oligomeric linear aluminoxanes that can be represented by the general formula:

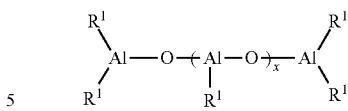

and oligomeric cyclic aluminoxanes that can be represented by the general formula:

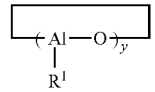

where x may be an integer of 1 to about 100, and in other embodiments about 10 to about 50; y may be an integer of 2 to about 100, and in other embodiments about 3 to about 20; and where each $R^1$, which may be the same or different, may be a mono-valent organic group that is attached to the aluminum atom via a carbon atom. Mono-valent organic groups are defined above. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting trihydrocarbylaluminum compounds with water. This reaction can be performed according to known methods, such as (1) a method in which the trihydrocarbylaluminum compound may be dissolved in an organic solvent and then contacted with water, (2) a method in which the trihydrocarbylaluminum compound may be reacted with water of crystallization contained in, for example, metal salts, or water adsorbed in inorganic or organic compounds, and (3) a method in which the trihydrocarbylaluminum compound may be reacted with water in the presence of the monomer or monomer solution that is to be polymerized.

Aluminoxane compounds include methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cylcohexylaluminoxane, 1-methylcyclopentylaluminoxane, phenylaluminoxane, 2,6-dimethylphenylaluminoxane, and the like, and mixtures thereof. Modified methylaluminoxane can be formed by substituting about 20-80% of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one embodiment, methylaluminoxane and at least one other organoaluminum compound (e.g., $AlR_nX_{3-n}$) such as diisobutyl aluminum hydride are employed in combination.

The term "organomagnesium compound" may refer to any magnesium compound that contains at least one magnesium-carbon bond. Organomagnesium compounds may be soluble in a hydrocarbon solvent. One class of organomagnesium compounds that can be utilized may be represented by the formula $MgR_2$, where each R, which may be the same or different, is a mono-valent organic group, with the proviso that the group is attached to the magnesium atom via a carbon atom. In one or more embodiments, each R may be a hydrocarbyl group, and the resulting organomagnesium compounds are dihydrocarbylmagnesium compounds. Examples of the hydrocarbyl groups include, but are not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups. These hydrocarbyl groups may contain heteroatoms such as, but not limited to, nitrogen, oxygen, silicon, sulfur, tin, and phosphorus atom.

Examples of suitable dihydrocarbylmagnesium compounds include diethylmagnesium, di-n-propylmagnesium, diisopropylmagnesium, dibutylmagnesium, dihexylmagnesium, diphenylmagnesium, dibenzylmagnesium, and mixtures thereof.

Another class of organomagnesium compounds that can be utilized include those that may be represented by the formula RMgX, where R is a mono-valent organic group, with the proviso that the group is attached to the magnesium atom via a carbon atom, and X is a hydrogen atom, a halogen atom, a carboxylate group, an alkoxide group, or an aryloxide group. Mono-valent groups are defined above. In one or more embodiments, X is a carboxylate group, an alkoxide group, or an aryloxide group.

Exemplary types of organomagnesium compounds that can be represented by the formula RMgX include, but are not limited to, hydrocarbylmagnesium hydride, hydrocarbylmagnesium halide, hydrocarbylmagnesium carboxylate, hydrocarbylmagnesium alkoxide, hydrocarbylmagnesium aryloxide, and mixtures thereof.

Specific examples of organomagnesium compounds that may be represented by the formula RMgX include methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, benzylmagnesium phenoxide, and the like, and mixtures thereof.

Various halogen-containing compounds, or mixtures thereof, that contain one or more labile halogen atoms can be employed. Examples of halogen atoms include, but are not limited to, fluorine, chlorine, bromine, and iodine. A combination of two or more halogen-containing compounds having different halogen atoms can also be utilized. In one or more embodiments, the halogen-containing compounds may be soluble in a hydrocarbon solvent. In other embodiments, hydrocarbon-insoluble halogen-containing compounds, which can be suspended in the polymerization medium to form the catalytically active species, may be useful.

Suitable types of halogen-containing compounds include, but are not limited to, elemental halogens, mixed halogens, hydrogen halides, organic halides, inorganic halides, metallic halides, organometallic halides, and mixtures thereof.

Elemental halogens include fluorine, chlorine, bromine, and iodine. Mixed halogens include iodine monochloride, iodine monobromide, iodine trichloride, and iodine pentafluoride.

Hydrogen halides include hydrogen fluoride, hydrogen chloride, hydrogen bromide, and hydrogen iodide.

Organic halides include t-butyl chloride, t-butyl bromides, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, and methyl bromoformate.

Inorganic halides include phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Metallic halides include tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Organometallic halides include dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

Compounds containing non-coordinating anions are known in the art. In general, non-coordinating anions are sterically bulky anions that do not form coordinate bonds with, for example, the active center of a catalyst system due to steric hindrance. Exemplary non-coordinating anions include tetraarylborate anions and fluorinated tetraarylborate anions. Compounds containing a non-coordinating anion also contain a counter cation such as a carbonium, ammonium, or phosphonium cation. Exemplary counter cations include triarylcarbonium cations and N,N-dialkylanilinium cations. Examples of compounds containing a non-coordinating anion and a counter cation include triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, and N,N-dimethylanilinium tetrakis[3,5-bis(trifluoromethyl)phenyl]borate.

Non-coordinating anion precursors include compounds that can form a non-coordinating anion under reaction conditions. Exemplary non-coordinating anion precursors include triarylboron compounds, $BR_3$, where R is a strong electron-withdrawing aryl group such as a pentafluorophenyl or 3,5-bis(trifluoromethyl)phenyl group.

The lanthanide-based catalyst composition used in this invention may be formed by combining or mixing the foregoing catalyst ingredients. Although one or more active catalyst species are believed to result from the combination of the lanthanide-based catalyst ingredients, the degree of interaction or reaction between the various catalyst ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

The foregoing lanthanide-based catalyst composition may have high catalytic activity for polymerizing conjugated dienes into cis-1,4-polydienes over a wide range of catalyst concentrations and catalyst ingredient ratios. Several factors may impact the optimum concentration of any one of the catalyst ingredients. For example, because the catalyst ingredients may interact to form an active species, the optimum concentration for any one catalyst ingredient may be dependent upon the concentrations of the other catalyst ingredients.

In one or more embodiments, the molar ratio of the alkylating agent to the lanthanide compound (alkylating agent/Ln) can be varied from about 1:1 to about 1,000:1, in other embodiments from about 2:1 to about 500:1, and in other embodiments from about 5:1 to about 200:1.

In those embodiments where both an aluminoxane and at least one other organoaluminum agent are employed as alkylating agents, the molar ratio of the aluminoxane to the lanthanide compound (aluminoxane/Ln) can be varied from 5:1 to about 1,000:1, in other embodiments from about 10:1 to about 700:1, and in other embodiments from about 20:1 to about 500:1; and the molar ratio of the at least one other organoaluminum compound to the lanthanide compound (Al/Ln) can be varied from about 1:1 to about 200:1, in other embodiments from about 2:1 to about 150:1, and in other embodiments from about 5:1 to about 100:1.

The molar ratio of the halogen-containing compound to the lanthanide compound is best described in terms of the ratio of the moles of halogen atoms in the halogen-containing compound to the moles of lanthanide atoms in the lanthanide compound (halogen/Ln). In one or more embodiments, the halogen/Ln molar ratio can be varied from about 0.5:1 to about 20:1, in other embodiments from about 1:1 to about 10:1, and in other embodiments from about 2:1 to about 6:1.

In yet another embodiment, the molar ratio of the non-coordinating anion or non-coordinating anion precursor to the lanthanide compound (An/Ln) may be from about 0.5:1 to about 20:1, in other embodiments from about 0.75:1 to about 10:1, and in other embodiments from about 1:1 to about 6:1.

The lanthanide-based catalyst composition can be formed by various methods.

In one embodiment, the lanthanide-based catalyst composition may be formed in situ by adding the catalyst ingredients to a solution containing monomer and solvent, or to bulk monomer, in either a stepwise or simultaneous manner. In one embodiment, the alkylating agent can be added first, followed by the lanthanide compound, and then followed by the halogen-containing compound, if used, or by the compound containing a non-coordinating anion or the non-coordinating anion precursor.

In another embodiment, the lanthanide-based catalyst composition may be preformed. That is, the catalyst ingredients are pre-mixed outside the polymerization system either in the absence of any monomer or in the presence of a small amount of at least one conjugated diene monomer at an appropriate temperature, which may be from about −20° C. to about 80° C. The amount of conjugated diene monomer that may be used for preforming the catalyst can range from about 1 to about 500 moles, in other embodiments from about 5 to about 250 moles, and in other embodiments from about 10 to about 100 moles per mole of the lanthanide compound. The resulting catalyst composition may be aged, if desired, prior to being added to the monomer that is to be polymerized.

In yet another embodiment, the lanthanide-based catalyst composition may be formed by using a two-stage procedure. The first stage may involve combining the alkylating agent with the lanthanide compound either in the absence of any monomer or in the presence of a small amount of at least one conjugated diene monomer at an appropriate temperature, which may be from about −20° C. to about 80° C. The amount of monomer employed in the first stage may be similar to that set forth above for performing the catalyst. In the second stage, the mixture formed in the first stage and the halogen-containing compound, non-coordinating anion, or non-coordinating anion precursor can be charged in either a stepwise or simultaneous manner to the monomer that is to be polymerized.

In one or more embodiments, a solvent may be employed as a carrier to either dissolve or suspend the lanthanide-based catalyst or catalyst ingredients in order to facilitate the delivery of the catalyst or catalyst ingredients to the polymerization system. In other embodiments, conjugated diene monomer can be used as the catalyst carrier. In yet other embodiments, the catalyst ingredients can be used in their neat state without any solvent.

In one or more embodiments, suitable solvents include those organic compounds that will not undergo polymerization or incorporation into propagating polymer chains during the polymerization of monomer in the presence of catalyst. In one or more embodiments, these organic species are liquid at ambient temperature and pressure. In one or more embodiments, these organic solvents are inert to the catalyst. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed for environmental reasons. The low-boiling hydrocarbon solvents are typically separated from the polymer upon completion of the polymerization.

In one or more embodiments, the reactive polymer is prepared by anionic polymerization, wherein monomer is polymerized by using an anionic initiator. The key mechanistic features of anionic polymerization have been described in books (e.g., Hsieh, H. L.; Quirk, R. P. Anionic Polymerization: Principles and Practical Applications; Marcel Dekker: New York, 1996) and review articles (e.g., Hadjichristidis, N.; Pitsikalis, M.; Pispas, S.; Iatrou, H.; Chem. Rev. 2001, 101

(12), 3747-3792). Anionic initiators may advantageously produce living polymers that, prior to quenching, are capable of reacting with additional monomers for further chain growth or reacting with certain functionalizing agents to give functionalized polymers.

The practice of this invention is not limited by the selection of any particular anionic initiators. In one or more embodiments, the anionic initiator employed is a functional initiator that imparts a functional group at the head of the polymer chain (i.e., the location from which the polymer chain is started). In particular embodiments, the functional group includes one or more heteroatoms (e.g., nitrogen, oxygen, boron, silicon, sulfur, tin, and phosphorus atoms) or heterocyclic groups.

Exemplary anionic initiators include organolithium compounds. In one or more embodiments, organolithium compounds may include heteroatoms. In these or other embodiments, organolithium compounds may include one or more heterocyclic groups.

Types of organolithium compounds include alkyllithium, aryllithium compounds, and cycloalkyllithium compounds. Specific examples of organolithium compounds include ethyllithium, n-propyllithium, isopropyllithium, n-butyllithium, sec-butyllithium, t-butyllithium, n-amyllithium, isoamyllithium, and phenyllithium. Still other anionic initiators include organosodium compounds such as phenylsodium and 2,4,6-trimethylphenylsodium. Also contemplated are those anionic initiators that give rise to di-living polymers, wherein both ends of a polymer chain is living. Examples of such initiators include dilithio initiators such as those prepared by reacting 1,3-diisopropenylbenzene with sec-butyllithium. These and related difunctional initiators are disclosed in U.S. Pat. No. 3,652,516, which is incorporated herein by reference. Radical anionic initiators may also be employed, including those described in U.S. Pat. No. 5,552,483, which is incorporated herein by reference.

In particular embodiments, the organolithium compounds include a cyclic amine-containing compound such as lithiohexamethyleneimine. These and related useful initiators are disclosed in the U.S. Pat. Nos. 5,332,810, 5,329,005, 5,578,542, 5,393,721, 5,698,646, 5,491,230, 5,521,309, 5,496,940, 5,574,109, and 5,786,441, which are incorporated herein by reference. In other embodiments, the organolithium compounds include alkylthioacetals such as 2-lithio-2-methyl-1,3-dithiane. These and related useful initiators are disclosed in U.S. Publ. Nos. 2006/0030657, 2006/0264590, and 2006/0264589, which are incorporated herein by reference. In still other embodiments, the organolithium compounds include alkoxysilyl-containing initiators, such as lithiated t-butyldimethylpropoxysilane. These and related useful initiators are disclosed in U.S. Publ. No. 2006/0241241, which is incorporated herein by reference.

In one or more embodiments, the anionic initiator employed is trialkyltinlithium compound such as tri-n-butyltinlithium. These and related useful initiators are disclosed in U.S. Pat. Nos. 3,426,006 and 5,268,439, which are incorporated herein by reference.

Anionic polymerization may be conducted in polar solvents, non-polar solvents, and mixtures thereof. Exemplary solvents have been set forth above. When preparing elastomeric copolymers, such as those containing conjugated diene monomers and vinyl-substituted aromatic monomers, the conjugated diene monomers and vinyl-substituted aromatic monomers may be used at a ratio of 95:5 to 50:50, or in other embodiments, 95:5 to 65:35.

Regardless of whether the reactive polymer is prepared by coordination polymerization or anionic polymerization techniques, the production of the reactive polymer can be accomplished by polymerizing conjugated diene monomer, optionally together with monomer copolymerizable with conjugated diene monomer, in the presence of a catalytically effective amount of the catalyst or initiator. The introduction of the catalyst or initiator, the conjugated diene monomer, optionally the comonomer, and any solvent if employed forms a polymerization mixture in which the reactive polymer is formed. The amount of the catalyst or initiator to be employed may depend on the interplay of various factors such as the type of catalyst or initiator employed, the purity of the ingredients, the polymerization temperature, the polymerization rate and conversion desired, the molecular weight desired, and many other factors. Accordingly, a specific catalyst or initiator amount cannot be definitively set forth except to say that catalytically effective amounts of the catalyst or initiator may be used.

In one or more embodiments, where a coordination catalyst (e.g., a lanthanide-based catalyst) is employed, the amount of the coordinating metal compound (e.g., a lanthanide compound) used can be varied from about 0.001 to about 2 mmol, in other embodiments from about 0.005 to about 1 mmol, and in still other embodiments from about 0.01 to about 0.2 mmol per 100 gram of monomer.

In other embodiments, where an anionic initiator (e.g., an alkyllithium compound) is employed, the initiator loading may be varied from about 0.05 to about 100 mmol, in other embodiments from about 0.1 to about 50 mmol, and in still other embodiments from about 0.2 to about 5 mmol per 100 gram of monomer.

In one or more embodiments, the polymerization may be carried out in a polymerization system that includes a substantial amount of solvent. In one embodiment, a solution polymerization system may be employed in which both the monomer to be polymerized and the polymer formed are soluble in the solvent. In another embodiment, a precipitation polymerization system may be employed by choosing a solvent in which the polymer formed is insoluble. In both cases, an amount of solvent in addition to the amount of solvent that may be used in preparing the catalyst is usually added to the polymerization system. The additional solvent may be the same as or different from the solvent used in preparing the catalyst or initiator. Exemplary solvents have been set forth above. In one or more embodiments, the solvent content of the polymerization mixture may be more than 20% by weight, in other embodiments more than 50% by weight, and in still other embodiments more than 80% by weight based on the total weight of the polymerization mixture.

In other embodiments, the polymerization system employed may be generally considered a bulk polymerization system that includes substantially no solvent or a minimal amount of solvent. Those skilled in the art will appreciate the benefits of bulk polymerization processes (i.e., processes where monomer acts as the solvent), and therefore the polymerization system includes less solvent than will deleteriously impact the benefits sought by conducting bulk polymerization. In one or more embodiments, the solvent content of the polymerization mixture may be less than about 20% by weight, in other embodiments less than about 10% by weight, and in still other embodiments less than about 5% by weight based on the total weight of the polymerization mixture. In still another embodiment, the polymerization mixture is substantially devoid of solvent, which refers to the absence of that amount of solvent that would otherwise have an appreciable impact on the polymerization process. Polymerization systems that are substantially devoid of solvent may be referred to as including substantially no solvent. In particular embodiments, the polymerization mixture is devoid of solvent.

The polymerization may be conducted in any conventional polymerization vessels known, in the art. In one or more embodiments, solution polymerization can be conducted in a conventional stirred-tank reactor. In other embodiments, bulk polymerization can be conducted in a conventional stirred-tank reactor, especially if the monomer conversion is less than about 60%. In still other embodiments, especially where the monomer conversion in a bulk polymerization process is higher than about 60%, which typically results in a highly viscous cement, the bulk polymerization may be conducted in an elongated reactor in which the viscous cement under polymerization is driven to move by piston, or substantially by piston. For example, extruders in which the cement is pushed along by a self-cleaning single-screw or double-screw agitator are suitable for this purpose. Examples of useful bulk polymerization processes are disclosed in U.S. Publication No. 2005/0197474 A1, which is incorporated herein by reference.

In one or more embodiments, all of the ingredients used for the polymerization can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a major portion thereof) may be conducted.

The polymerization can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about −10° C. to about 200° C., in other embodiments from about 0° C. to about 150° C., and in other embodiments from about 20° C. to about 100° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

Regardless of whether the polymerization is catalyzed or initiated by a coordination catalyst system (e.g., a lanthanide-based system) or an anionic initiator (e.g., an alkyllithium initiator), some or all of the resulting polymer chains may possess reactive ends, which are either pseudo-living or living, before the polymerization mixture is quenched. As noted above, the reactive polymer may be referred to as a pseudo-living polymer where a coordination catalyst is employed or as a living polymer where an anionic initiator is employed. In one or more embodiments, a polymerzation mixture including reactive polymer may be referred to as an active polymerization mixture. The percentage of polymer chains possessing a reactive end depends on various factors such as the type of catalyst or initiator, the type of monomer, the purity of the ingredients, the polymerization temperature, the monomer conversion, and many other factors. In one or more embodiments, at least about 20% of the polymer chains possess a reactive end, in other embodiments at least about 50% of the polymer chains possess a reactive end, and in still other embodiments at least about 80% of the polymer chains possess a reactive end.

Any conjugated diene may be used herein. For example, suitable conjugated dienes which may be utilized in preparing the living and pseudo-living polymers and interpolymers include 1,3-butadiene, 2-methyl-1,3-butadiene (isoprene), 2,3-dimethyl-1,3-butadiene, 1,3-pentadiene, 1,3-hexadiene and the like as well as mixtures thereof. The diene is 1,3-butadiene in one embodiment.

Any vinyl aromatic hydrocarbon may be used herein. For example, suitable vinyl aromatic hydrocarbons which may be utilized in preparing the living and pseudo-living interpolymers include styrene, vinyl toluene, alpha-methyl styrene, vinyl naphthalene, vinyl pyridine and the like. The vinyl aromatic hydrocarbon is styrene in one embodiment.

The terminally functionalized polymers of the disclosure are prepared by reacting the above living or pseudo-living polymers, with the specific allyl glycidyl ether, or the specific allylhalosilane, or combinations thereof that have been described herein.

The allyl glycidyl ethers which may be employed comprise the general formula $CH_2=CHCH_2OCH_2-X$ wherein X is an epoxy group as follows:

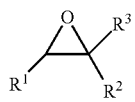

wherein, $R^1$, $R^2$, and $R^3$ are the same or different, and are selected from hydrogen or a monovalent organic group. In one or more embodiments, the monovalent organic groups may include hydrocarbyl groups or substituted hydrocarbyl groups such as, but not limited to, alkyl, cycloalkyl, substituted cycloalkyl, aryl, substituted aryl, aralkyl, alkaryl, with each group having from 1 to 30 carbon atoms. The hydrocarbyl groups may contain heteroatoms such as, but not limited to, nitrogen, boron, oxygen, silicon, sulfur, and phosphorus atoms The allylhalosilanes which may be employed comprise the general formula $CH_2=CHCH_2Si(R^1R^2)-X$ wherein $R^1$ and $R^2$ are the same or different, and are selected from a monovalent organic group. In one or more embodiments, the monovalent organic groups may include hydrocarbyl groups or substituted hydrocarbyl groups such as, but not limited to, alkyl, cycloalkyl, substituted cycloalkyl, aryl, substituted aryl, aralkyl, alkaryl, with each group having from 1 to 30 carbon atoms. The hydrocarbyl groups may contain heteroatoms such as, but not limited to, nitrogen, boron, oxygen, silicon, sulfur, and phosphorus atoms, and X is a halide selected from the group consisting of a chloride, a bromide, or an iodide.

The reaction of the living or pseudo-living polymer in solution with the terminating agent can be conducted if desired by simply adding the terminating agent to the polymer solution. However, in one embodiment, the terminating agent is added in the form of a solution thereof in an appropriate solvent for ease of handling.

The amounts of terminating agent added to the living polymer are dependent upon the amounts of live organoalkali metal end groups (e.g. live lithium end groups) present in the living polymer and the amounts of terminating agent desired in the finished polymer. It will be noted that the number of moles of live alkali metal end groups in the living polymer is presumed to be equivalent to the number of moles of alkali metal groups present in the organoalkali metal initiator utilized to effect polymerization. In general, the amount of terminating agent employed to react with the live alkali metal groups of the living polymer herein may range from less than stoichiometric, i.e. 0.75 moles of terminating agent per mole of live alkali metal end groups, to stoichiometric, i.e. about 1 mole of terminating agent per mole of live alkali metal end groups, to a large excess of terminating agent. However, from about 0.9 to 2.0 moles of terminating agent per mole of alkali metal end groups is used in one embodiment.

With respect to the pseudo-living polymers, the amount of terminating agent added may range from about 10 to about 200 moles of terminating gent per mole of metal of the pseudo-living polymer, in one embodiment. In another embodiment, the molar ratio of terminating agent may vary from about 30 moles of terminating agent per mole of metal of the pseudo-living polymer, and in yet another embodiment, from about 50 to about 100 moles of terminating agent per mole of metal of the pseudo-living polymer.

Temperatures employed in reacting the living or pseudo-living polymer with the terminating agent may vary considerably and may range in one embodiment, from about 0° C. to about 100° C., with temperatures ranging in another embodiment, from about 30° C. to about 100° C., and in another embodiment, the temperatures ranging from 50° C. to 80° C. The reaction times may also vary considerably and are, in general, dependent upon reaction temperatures. Hence, the reaction times may range in one embodiment, from about 15 minutes to about 24 hours.

The resultant terminally functionalized polymer can be recovered from the polymer solution and dried using conventional procedures. Thus, for example, the polymer can be recovered from solution by direct drum drying, extruder drying, air drying or by coagulation either by adding a sufficient volume of a non-solvent liquid (e.g. and alcohol) for the polymer to the solution or, alternatively, by adding the polymer solution to a sufficient volume of the non-solvent. It is usually desirable in carrying out the coagulation procedure to include an appropriate antioxidant for the polymer in the non-solvent. The recovered polymer can then be dried using a conventional polymer drying procedure such as drum drying, vacuum drying, extruder drying, tunnel drying, oven drying and the like.

The terminally functionalized polymers of the disclosure comprising a living polymer obtained by anionic polymerization or a pseudo-living polymer obtained by coordination polymerization, of a diene monomer or a mixture of a diene monomer and a vinyl aromatic hydrocarbon monomer reacted with at least one of a certain allyl glycidyl ether or at least one of a certain allylhalosilane, or a combination thereof, as specified herein, are useful in the production of high impact styrenic resins. Typical high impact styrenic resins include high impact polystyrene (HIPS) and acrylonitrile/butadiene/styrene copolymer (ABS). It is well known that such high impact styrenic polymers, or rubber modified polymers, may be prepared by polymerizing a styrenic component in the presence of a rubber component, such that the rubber component is dispersed within the styrenic polymer component.

In preparing the high impact styrenic resins or polymeric compositions, any polymer produced from a vinyl aromatic monomer may be used. For example, the monomer may comprise a homopolymer or interpolymer of a styrenic monomer, an interpolymer of a styrenic monomer and an interpolymerizable vinyl monomer, or the like.

As the styrenic monomer, there may be mentioned, for example, styrene, alkylstyrenes [e.g., monoalkylstyrenes such as vinyltoluenes (e.g., o-, m-, p-methylstyrenes), vinylxylenes (e.g., 2,4-dimethylstyrene), and alkyl-substituted styrenes (e.g., $C_{1-4}$alkylstyrenes) such as ethylstyrene, p-isopropylstyrene, butylstyrene, and p-t-butylstyrene; dialkylstyrenes (di$C_{1-4}$alkylstyrenes such as 2,4-dimethylstyrene); α-alkyl-substituted styrenes (e.g., α-$C_{1-2}$alkylstyrenes such as α-methylstyrene and α-methyl-p-methylstyrene], alkoxystyrenes (e.g., $C_{1-4}$alkoxystyrenes such as o-methoxystyrene, m-methoxystyrene, p-methoxystyrene, p-t-butoxystyrene), halostyrenes (e.g., o-, m-, and p-chlorostyrenes, p-bromostyrene). These styrenic monomers can be used either singly or in combination. In several embodiments, the styrenic monomer includes styrene, vinyltoluenes, and α-methylstyrene, and in one embodiment, the monomer is styrene.

As the interpolymerizable vinyl monomer, there may be utilized, for example, α,β-unsaturated nitriles [e.g., vinyl cyanides such as (meth)acrylonitrile, halogenated (methyl) acrylonitrile (chloro(meth)acrylnitrile, etc.)], α,β-unsaturated carboxylates (particularly, alkylesters) [e.g., (meth) acrylic acid alkylesters; (meth)acrylic acid $C_{5-7}$cycloalkylesters such as cyclohexyl (meth)acrylate; (meth)acrylic acid $C_{6-12}$aryl esters such as phenyl (meth) acrylate; (meth)acrylic acid $C_{7-14}$arakyl esters such as benzyl (meth)acrylate; or maleic acid mono- or dialkylester, fumaric acid mono- or dialkylesters, and itaconic acid mono- or dialkylesters corresponding to these (meth)acrylic acid esters], vinyl ester-series monomers [e.g., carboxylic acid vinyl esters such as $C_{1-10}$ carboxylic vinyl esters typified by vinyl formate, vinyl acetate, vinyl propionate, vinyl pivalate (particularly, $C_{1-6}$ carboxylic acid vinyl esters)], hydroxyl group-containing monomers [e.g., hydroxyalkl(meth)acrylates such as hydroxyethyl(meth)acrylate and hydroxypropyl (meth) acrylate (e.g., hydroxy$C_{1-10}$alkyl(meth)acrylates, preferably, hydroxy$C_{1-4}$alkyl(meth)acrylates)], glycidyl group-containing monomers [e.g., glycidyl (methyl)acrylate], carboxyl group-containing monomers [e.g., α,β-unsaturated monocarboxylic acids such as (meth)acrylic acid; α,β-unsaturated polycarboxylic acids such as maleic acid, fumaric acid, and itaconic acid; or acid anhydrides thereof (e.g., maleic anhydride, fumaric anhydride)], amino group-containing monomers [e.g. N,N-dimethylaminoethyl (meth) acrylate, N,N-diethylaminopropyl (meth)acrylate], amide-series monomers [e.g., (meth)acrylamide, or derivatives thereof (e.g., N-methyl(meth)acrylamide, N,N-dimethyl (meth)acrylamide, N-methylol(meth)acrylamide), or fumaric acid amides corresponding thereto (e.g., fumaramide, fumaramic acid, or derivatives thereof)], imide-series monomers (e.g., maleimide, N—$C_{1-4}$alkyl maleimides such as N-methylmaleimide, N-phenylmaleimide), conjugated diene-series monomers [e.g., $C_{4-16}$ dienes such as butadiene, isoprene, chloroprene, neoprene, 1,3-pentadiene, 1-chlorobutadiene, 2,3-dimethyl-1,3-butadiene, 3-butyl-1,3 octadiene, and phenyl-1,3-butadiene (preferably, $C_{4-10}$ dienes)], olefinic monomers [e.g., $C_{2-10}$ alkenes such as ethylene, propylene, butene (e.g., isobutene)], vinyl halides (e.g., vinyl fluoride, vinyl chloride, vinyl bromide, vinyl iodide), and vinylidene halides (e.g., vinylidene fluoride, vinylidene chloride, vinylidene bromide, vinylidene iodide). The (meth)acrylic acid alkylester includes (meth)acrylic acid $C_{1-20}$alkyl esters such as methyl (meth)acrylate, ethyl (meth)acrylate, butyl (meth)acrylate, t-butyl (meth)acrylate, hexyl (meth)acrylate, octyl (meth)acrylate, 2-ethylhexyl (meth)acrylate, and lauryl (meth)acrylate (preferably, (meth)acrylic acid $C_{1-14}$alkyl esters), or combinations.

The rubber component of the high impact, or rubber modified polymeric compositions of the disclosure comprises at least one, or more, of the terminally functionalized polymers described herein. These are terminally functionalized polymers comprising a living polymer obtained by anionic polymerization, or a pseudo-living polymer obtained by coordination polymerization, of a diene-monomer or a mixture of a diene monomer and a vinyl aromatic hydrocarbon monomer, reacted with at least one allyl glycidyl ether having the general formula $CH_2$=$CHCH_2OCH_2$—X wherein X is an epoxy group as follows:

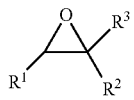

wherein, $R^1$, $R^2$, and $R^3$ are the same or different, and are selected from hydrogen or a monovalent organic group. In one or more embodiments, the monovalent organic groups may include hydrocarbyl groups or substituted hydrocarbyl groups such as, but not limited to, alkyl, cycloalkyl, substituted cycloalkyl, aryl, substituted aryl, aralkyl, alkaryl, with each group having from 1 to 30 carbon atoms. The hydrocarbyl groups may contain heteroatoms such as, but not limited to, nitrogen, boron, oxygen, silicon, sulfur, and phosphorus atoms; or at least one allylhalosilane having the general formula $CH_2$=$CHCH_2Si(R^1R^2)$—X wherein $R^1$ and $R^2$ are the same or different, and are selected from a monovalent organic group. In one or more embodiments, the monovalent organic groups may include hydrocarbyl groups or substituted hydrocarbyl groups such as, but not limited to, alkyl, cycloalkyl, substituted cycloalkyl, aryl, substituted aryl, aralkyl, alkaryl, with each group having from 1 to 30 carbon atoms. The hydrocarbyl groups may contain heteroatoms such as, but not limited to, nitrogen, boron, oxygen, silicon, sulfur, and phosphorus atoms, and X is a halide selected from a chloride, a bromide, or an iodide; or a combination of the allyl glycidyl ether and the allylhalosilane.

The rubber components are described hereinabove.

Exemplary of the rubber modified styrenic resins are high impact polystyrene (HIPS), styrene-butadiene-styrene (SBS resin), styrene-isoprene-styrene (SIS resin), acrylonitrile-butadiene-styrene copolymer (ABS resin), acrylonitrile-acrylic rubber-styrene copolymer (AAS resin), acrylonitrile-(ethylene-propylene rubber)-styrene copolymer, acrylonitrile-EPDM-styrene copolymer (AES resin), and methyl methacrylate-butadiene-styrene copolymer (MBS resin). In several embodiments, HIPS and ABS resin are the rubber modified resins.

The high impact styrenic resins may be prepared by any known procedure. The methods include bulk polymerization, solution polymerization, suspension polymerization, emulsion polymerization, and the like. The polymerizations may be carried out under pressure. The polymerizations may be carried out at temperatures ranging from about 80° C. to about 230° C. or the like. The polymerizations may be batch or continuous. In preparing the high impact styrenic resins herein amounts of about 3 to about 40 weight % of the rubber component may be used, in one embodiment, and in another embodiment, from about 5 to about 20% of the rubber; further, the vinyl aromatic component may be used in amounts of about 60 to 97% by weight in one embodiment, and in another embodiment, from about 80 to 95 weight %.

In the present disclosure the method for preparing high impact, or rubber-modified, styrenic resin compositions is as follows, and was utilized in Examples 9-16 herein.

HIPS Preparation—HIPS batches are prepared by first dissolving about 48 grams of butadiene polymer or butadiene-styrene block polymer from Table I (shown hereinafter) that is added to 752 grams styrene to make a solution of 800 grams total weight. This solution is then added to a 1.5 liter jacketed glass reactor containing a helical agitator with a hollow shaft having two holes at the bottom for solution to enter, and two holes at the top for solution to exit, allowing mixing of the styrene rubber solution. About 141 grams of ethylbenzene is added with 20 grams mineral oil, 0.64 grams Ciba's IRGANOX 1076 antioxidant in a 10% solution in hexanes and 0.15 milliliters of tert-butylperbenzoate. The mixture is then heated to 100° C. to initiate polymerization of the styrene monomer. The mixture is further heated to between 130-160° C. over a period of 6 hours. During this time, phase inversion occurs where the polystyrene becomes the continuous phase with insoluble butadiene polymer rubber particles present. The mixture is then transferred from the reactor to a vacuum oven at 240° C. to remove volatile components such as residual styrene and ethylbenzene, and results in crosslinking of the conjugated diene phase. The dried polystyrene containing butadiene polymer or copolymer rubber particles is then evaluated using appropriate test methods.

A typical method for preparing the terminally functionalized polymers of the present disclosure is described as follows:

Synthesis of Butadiene Polymer or Butadiene-Styrene Block Copolymer—Under nitrogen atmosphere, to a solution of butadiene in hexane was added a certain amount of n-butyllithium solution. After the polymerization was carried out at a certain temperature for some time, the resulting living polybutadiene polymer was terminated by isopropanol or a terminator to yield a modified butadiene polymer. To the living polybutadiene polymer solution was added a certain amount of styrene solution. The polymerization continued until no styrene was left to produce a living butadiene styrene block copolymer. Terminating the living polymer with isopropanol or a terminator produced a modified butadiene styrene block copolymer.

The following examples are submitted for the purpose of further illustrating the nature of the present invention and should not be regarded as a limitation on the scope thereof. Parts and percentages shown in the examples are by weight unless otherwise indicated.

EXAMPLES

The following test procedures were used in carrying out the following examples:

Molecular Weight—The number average molecular weight ($M_n$) and the weight average molecular weight ($M_w$) of the polymers are determined by gel permeation chromatography (GPC) using polystyrene standards and Mark Houwink constants to correct for chain length properties of polybutadiene. In determining the molecular weight values for ($M_n$) and ($M_w$) a dilute solution of polymer in tetrahydrofuran (about 0.1 weight %) is injected into a liquid chromatograph with size exclusion columns (LC/SEC) that is calibrated against known polystyrene standards, then corrected with Mark Houwink constants found in the literature, according to polymer structure, that is, butadiene, styrene, vinyl content.

Vinyl Content—$^1$H NMR spectra of polymers were recorded on Varian's 300 Spectrometer. Vinyl content percentage in polymers was calculated from the spectra based on total butadiene content. $^1$H NMR is the well known Proton Nuclear Magnetic Resonance Technique.

Melt Index—Melt Index is determined according to ASTM D1238, condition g, which requires a temperature of 200° C., and a 5 kg weight. Melt index is reported in units of g/10 minutes.

Rubber Content, %—Rubber Content, %, is the total butadiene polymer or butadiene styrene block copolymer in the rubber comprising vinyl aromatic thermoplastic polymer.

Izod Impact—Izod Impact is determined according to ASTM D-256. The results are reported in units of ft-lbs per inch.

60° Gloss—60° gloss is determined according to ASTM D-2457 at a 60° angle.

In all of the following Examples 1-8 herein, all chemicals that were used were dried and kept under nitrogen atmosphere.

In Example 1, there is described the preparation of a living polybutadiene which is not terminated. In Example 2, there is described the preparation of a polybutadiene as shown in Example 1, which is then terminated with allylglycidyl ether (AGE herein). In Example 3, there is described the preparation of a polybutadiene as shown in Example 1, which is then terminated with allylchlorodimethylsilane (ACDMS herein). In Example 4, there is described the preparation of a polybutadiene as shown in Example 1, which is then terminated with both AGE and ACDMS.

In Example 5, there is described the preparation of a living poly (butadiene-block-styrene), herein poly (Bd-b-St) which is not terminated. In Example 6, there is described the preparation of a poly (Bd-b-St) as shown in Example 5, which is then terminated with AGE. In Example 7, there is described the preparation of a poly (Bd-b-St) as shown in Example 5, which is then terminated with ACDMS. In Example 8, there is described the preparation of a poly (Bd-b-St) as shown in Example 5, which is then terminated with ACDMS. In Example 8, there is described the preparation of a poly (Bd-b-St), as shown in Example 5, which is then terminated with both AGE and ACDMS.

Example 1

Preparation of Polybutadiene

Under nitrogen to a dry 2-gallon reactor was charged 4128 g of 15.0% butadiene solution in hexane, followed by 3.87 mL of 1.6 M butyl lithium solution in hexane. After the polymerization was carried out for 2.0 hours at 60° C., the living polybutadiene anion solution was poured into isopropanol containing Butylated hydroxytoluene (BHT) as antioxidant and the coagulated polymer was dried by a drumdrier. The molecular weight of the polymer was determined by GPC. It was found: Mn=92,587; Mw=97,796; Mw/Mn=1.10. The vinyl content is 8.7% determined by $^1$H NMR.

Example 2

Preparation of AGE Terminated Polybutadiene

The living polybutadiene anion solution was prepared as in Example 1 and split into dry and oxygen-free bottles. An equivalent of 1.0 M AGE solution to butyl lithium was added to the polymeric anion solution. The solution was agitated for 60 minutes at 50° C., then poured into isopropanol containing BHT as antioxidant and the coagulated polymer was dried by a drum-drier. The molecular weight of the AGE-terminated polymer was determined by GPC. It was found: Mn=114,091; Mw=117,343; Mw/Mn=1.03. The vinyl content is 8.6% determined by $^1$H NMR.

Example 3

Preparation of ACDMS Terminated Polybutadiene

The living polybutadiene anion solution was prepared as in Example 1 and split into dry and oxygen-free bottles. An equivalent of 1.0 M allylchlorodimethylsilane (ACDMS) solution to butyl lithium was added to the polymeric anion solution. The solution was agitated for 60 minutes at 50° C., then poured into isopropanol containing BHT and the coagulated polymer was dried by a drum-drier. The molecular weight of the allyldimethylsilyl-terminated polybutadiene was determined by GPC. It was found: Mn=92,040; Mw=97,325; Mw/Mn=1.06. The vinyl content is 8.4% determined by $^1$H NMR.

Example 4

Preparation of Polybutadiene Terminated with AGE and ACDMS

The living polybutadiene anion solution was prepared as in Example 1 and split into dry and oxygen-free bottles. An equivalent of 1.0 M AGE solution to butyl lithium was added to the polymeric anion solution and was agitated for 40 minutes at 60° C. Then, the same equivalent of 1.0 M ACDMS solution was added and the solution was agitated for 60 minutes at 50° C. The polymer solution was poured into isopropanol containing BHT and the coagulated polymer was dried by a drum-drier. The molecular weight of the terminated polybutadiene was determined by GPC. It was found: Mn=87,199; Mw=91,455; Mw/Mn=1.05. The vinyl content is 8.7% determined by $^1$H NMR.

Example 5

Preparation of Poly(butadiene Styrene Block Polymer

Under nitrogen to a dry 2-gallon reactor was added 1364 g of hexane, 2410 g of 21.6% butadiene solution in hexane, followed by 3.83 mL of 1.6 M butyl lithium solution in hexane. After the polymerization was carried out for 2 h at 60° C., 3.83 mL of 1.6 M 2,2-bis(2'-tetrahydrofuryl)propane solution in hexane was added to the solution, followed by 278 g of 33.0% styrene solution in hexane. After 1 h, the polymer cement was poured into isopropanol containing BHT and the coagulated polymer was dried by a drum-drier. The molecular weight of the (Bd-b-St block) polymer was determined by GPC. It was found: Mn=101,291; Mw=107,745; Mw/Mn=1.06. The vinyl content is 8.8% (Bd=100%) and the styrene content is 15.1%, both determined by $^1$H NMR. The vinyl content is based upon Bd being equal to 100%.

Example 6

Preparation of AGE Terminated Poly (Bd-b-St)

The living butadiene styrene block polymer solution was prepared as in Example 5 and split into dry and oxygen-free bottles. An equivalent of 1.0 M AGE solution to butyl lithium was added to the polymeric anion solution. The solution was agitated for 40 minutes at 50° C., then poured into isopropanol containing BHT and the coagulated polymer was dried by a drum-drier. The molecular weight of the AGE-terminated (Bd-b-St) block polymer was determined by GPC. It was found: Mn=101,529; Mw=108,602; Mw/Mn=1.07. The vinyl content is 8.7% (Bd=100%) and the styrene content is 14.4%, both determined by $^1$H NMR. The vinyl content is based on Bd being equal to 100%.

Example 7

Preparation of ACDMS Terminated Poly (Bd-b-St)

The living butadiene styrene block polymer solution was prepared as in Example 5 and split into dry and oxygen-free bottles. An equivalent of 1.0 M allylchlorodimethylsilane (ACDMS) solution to butyl lithium was added to the polymeric anion solution. The solution was agitated for 60 minutes at 50° C., then poured into isopropanol containing BHT and the coagulated polymer was dried by a drum-drier. The molecular weight of the allyldimethylsilyl-terminated Bd-b-St block polymer was determined by GPC. It was found: Mn=96,401; Mw=102,129; Mw/Mn=1.06. The vinyl content is 8.7% (Bd=100%) and the styrene content is 15.2%, both determined by $^1$H NMR. The vinyl content is based upon Bd being equal to 100%.

Example 8

Preparation of Poly(Bd-b-St) Terminated with AGE and ACDMS

The living butadiene styrene block polymer solution was prepared as in Example 5 and split into dry and oxygen-free bottles. An equivalent of 1.0 M AGE solution to butyl lithium was added to the polymeric anion solution. The solution was agitated for 40 minutes at 50° C. Then, the same equivalent of 1.0 M allylchlorodimethylsilane (ACDMS) solution was added and the solution was agitated for 30 minutes at 50° C. The polymer cement was poured into isopropanol containing BHT and the coagulated polymer was dried by a drum-drier. The molecular weight of the terminated Bd-b-St block polymer was determined by GPC. It was found: Mn=101,936; Mw=109,469; Mw/Mn=1.07. The vinyl content is 8.7% (Bd=100%) and the styrene content is 14.4%, both determined by $^1$H NMR. The vinyl content is based upon Bd being equal to 100%.

Examples 9-16

In the following examples 9-16, there are disclosed the preparation of HIPS batches utilizing the polymers of Examples 1-8. The polymers of Examples 1 and 5 are not terminated. The polymers of Examples 2, 3, and 4, are polybutadienes terminated, respectively, with AGE, ACDMS, and both AGE and ACDMS. The polymers of Examples 6, 7, 8 are poly (Bd-b-St) polymers terminated, respectively, with AGE, ACDMS, and both AGE and ACDMS.

The method for preparation of the HIPS batches of Examples 9-16 has been described hereinabove.

The HIPS batches of Examples 9-16, and the properties of the HIPS batches, are set forth in TABLE 1.

TABLE 1

| Polymer Type | Polybutadiene | | | | (Poly(Bd-b-St)) | | | |
|---|---|---|---|---|---|---|---|---|
| Example No. | 9 | 10 | 11 | 12 | 13 | 14 | 15 | 16 |
| Polymer Example No. | 1 | 2 | 3 | 4 | 5 | 6 | 7 | 8 |
| Terminator | None | AGE | ACDMS | AGE + ACDMS | None | AGE | ACDMS | AGE + ACDMS |
| HIPS Properties | | | | | | | | |
| Rubber content, % | 6.7 | 9.0 | 8.2 | 9.5 | 6.6 | 8.0 | 7.2 | 7.2 |
| Melt Index | 6.5 | 4.0 | 4.2 | 4.6 | 4.2 | 5.8 | 5.5 | 3.5 |
| Izod | 0.46 | 0.50 | 0.42 | 0.93 | 0.61 | 0.77 | 0.56 | 0.38 |
| Gloss, 60° | 45.8 | 86.6 | 87 | 52.9 | 49.6 | 66.2 | 73.9 | 94.3 |

From the data in Table I, it will be noted that use of the terminated polymers in preparing the HIPS products results in HIPS products having a gloss level that is increased as compared with HIPS products prepared using the same polymers that were not terminated.

Furthermore, from the data in Table 1, it will also be noted that the HIPS products prepared using terminated polymers typical of the present disclosure, are suitable for use as high impact styrene resins for various applications.

It should be clearly understood that the forms of the invention herein described are illustrative only and are not intended to limit the scope of the invention. The present invention includes all modifications falling within the scope of the following claims.

What is claimed is:

1. A terminally functionalized polymer comprising the reaction product of a living polymer and at least one component selected from the group consisting of:

(a) an allyl glycidyl ether having the formula (I)

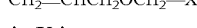

wherein X is an epoxy group as follows:

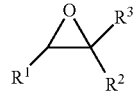

wherein $R^1$, $R^2$, and $R^3$ are the same or different, and are selected from hydrogen, alkyl groups having from 1 to 30 carbon atoms or aryl groups having from 1 to 30 carbon atoms;

(b) an allylhalosilane having the formula (II)

$$CH_2=CHCH_2Si(R^1R^2)-X$$

wherein $R^1$ and $R^2$ are the same or different, and are selected from alkyl groups having from 1 to 30 carbon atoms or aryl groups having from 1 to 30 carbon atoms, and X is a halide selected from a chloride, a bromide, and an iodide, and (c) a combination of (a) and (b);

wherein the living polymer is a homopolymer of a diene monomer.

2. The terminally functionalized polymer of claim 1 wherein the component is allyl glycidyl ether.

3. The terminally functionalized polymer of claim 1 wherein the component is allylchlorodimethylsilane.

4. The terminally functionalized polymer of claim 1 wherein the component is a combination of allyl glycidyl ether and allylchlorodimethylsilane.

5. The terminally functionalized living polymer of claim 1, wherein the diene monomer is selected from the group consisting of: 1,3-butadiene, isoprene, 2,3-dimethyl-1,3-butadiene, 1,3-pentadiene, or 1,3-hexadiene.

6. A rubber-modified high-impact polymeric composition comprising a polymer comprised of a vinyl aromatic monomer and a rubber dispersed within the vinyl aromatic polymer wherein the rubber is a terminally functionalized polymer comprising the reaction product of a living polymer and at least one component selected from the group consisting of:

(a) an allyl glycidyl ether having the formula (I)

$$CH_2=CHCH_2OCH_2-X$$

wherein X is an epoxy group as follows:

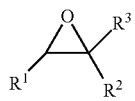

wherein $R^1$, $R^2$, and $R^3$ are the same or different, and are selected from hydrogen, alkyl groups having from 1 to 30 carbon atoms, or aryl groups having from 1 to 30 carbon atoms;

(b) an allylhalosilane having the formula (II)

$$CH_2=CHCH_2Si(R^1R^2)-X$$

wherein $R^1$ and $R^2$ are the same or different, and are selected from alkyl groups having from 1 to 30 carbon atoms, or aryl groups having from 1 to 30 carbon atoms, and X is a halide selected from a chloride, a bromide, and an iodide, and (c) a combination of (a) and (b);

wherein the living polymer is a homopolymer of a diene monomer.

7. The rubber-modified high-impact polymeric composition of claim 6 wherein the component is selected from the group consisting of allyl glycidyl ether, allylchlorodimethylsilane and combinations of the same.

8. The rubber-modified high-impact polymeric composition of claim 6 wherein the rubber is present in an amount of about 3 to about 40 weight % based on total weight of the composition.

9. The rubber-modified high-impact polymeric composition of claim 6 wherein the polymer comprised of the vinyl aromatic monomer is an interpolymer of styrene and acrylonitrile.

10. The rubber-modified high-impact polymeric composition of claim 6 wherein the polymer comprised of the vinyl aromatic monomer is a homopolymer of styrene.

11. The rubber-modified high-impact polymeric composition of claim 6, wherein the diene monomer is selected from the group consisting of: 1,3-butadiene, isoprene, 2,3-dimethyl-1,3-butadiene, 1,3-pentadiene, or 1,3-hexadiene.

* * * * *